April 5, 1938.                H. R. STUART                2,112,935
SIGNAL SWITCH ASSEMBLY
Filed Nov. 8, 1935                2 Sheets-Sheet 1

INVENTOR.
Harve R. Stuart.

April 5, 1938.  H. R. STUART  2,112,935
SIGNAL SWITCH ASSEMBLY
Filed Nov. 8, 1935   2 Sheets-Sheet 2
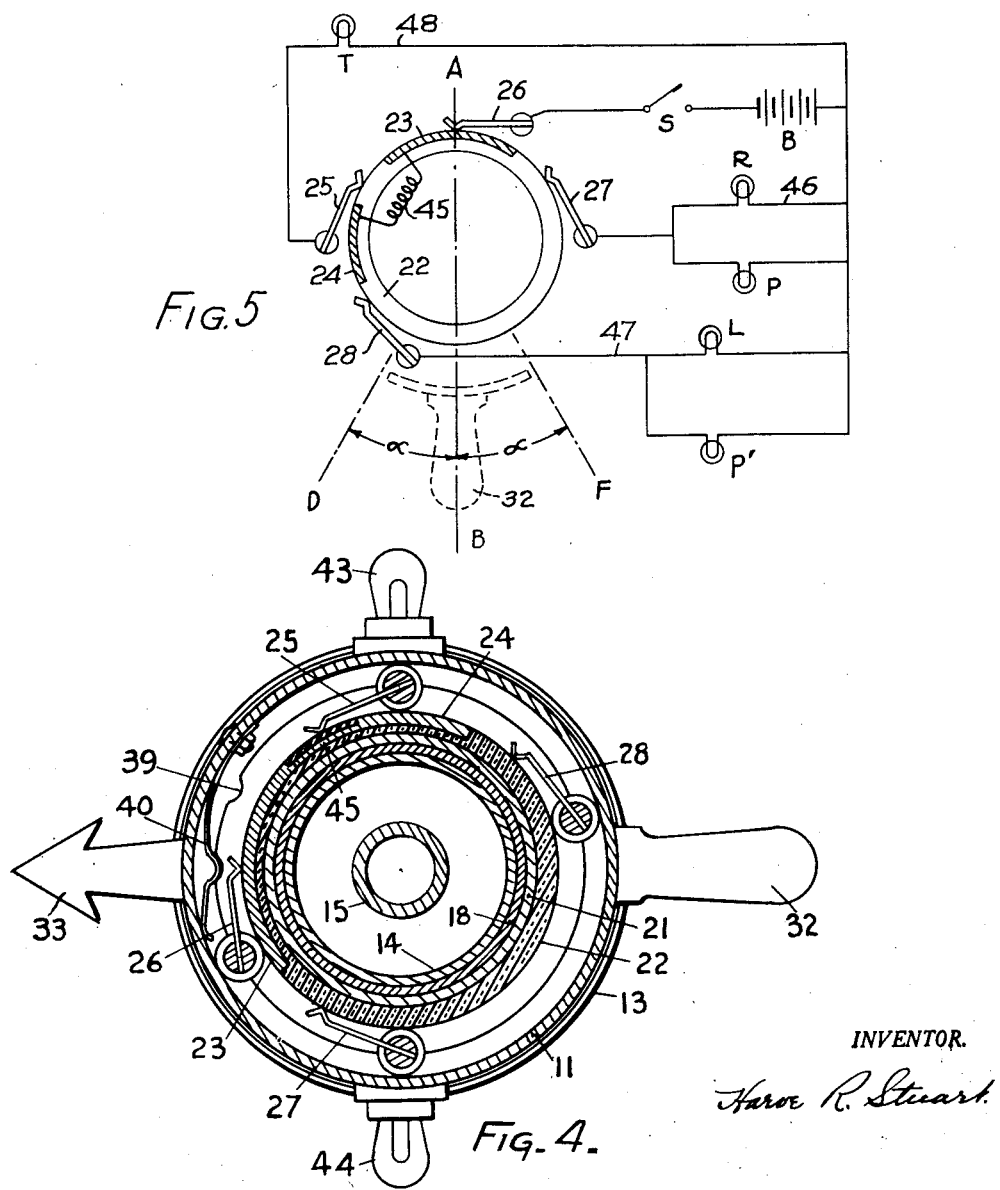
INVENTOR.
Harve R. Stuart.

Patented Apr. 5, 1938

2,112,935

UNITED STATES PATENT OFFICE 2,112,935

SIGNAL SWITCH ASSEMBLY

Harve R. Stuart, Springfield, Ohio

Application November 8, 1935, Serial No. 48,795

7 Claims. (Cl. 200—59)

This invention pertains to remote control means for electrical signals, and more particularly has to do with a novel system for switching from the driver's seat, lightable direction indicating means for automotive vehicles or the like.

As applied to such purposes, my assembled switch mechanism may comprise a plurality of component parts of which one such may constitute a fixed upturned chambered body member attached to a stationary element of a steering wheel installation such as its tubular supporting column. A cooperative movable companion member may include the rotatable steering wheel itself or some other equivalent part that is periodically actuated thereby and the movement of which member causes a given right hand or a left hand direction signal to be automatically deenergized.

Mounted within said body member are shiftable commutator means preferably of the drum type arranged to selectively control different signal circuits by bringing certain switch points into contact. Said controller means may be manipulatively actuated in one direction by the use of a double throw switch lever equipped with a ratchetlike return agency adapted to restore said lever into its medial or neutral position some time after one such circuit has been manually closed. My semi-automatic type of switch mechanism is so designed that the steering wheel is enabled to rotate unobstructedly in either direction and is not inherently limited in angular rotation nor in the number of wheel turns that may be needed to steer a car around a sharp radial pathway. Any abnormal steering wheel movement does not cause the other circuit to become energized so long as the aforesaid one circuit remains in active service.

Upon completing a car turn and resetting the steering wheel into its normal position for a straight ahead travel course, said switch lever will have been automatically returned to its "off" or neutral position and thereby deenergize a given direction signal without requiring any attention on the part of the car driver other than to initially manipulate said lever. This manual operation may herein be performed prior to making a contemplated car turn so that any closely trailing driver may receive adequate notice thereof. As an additional safeguard, automatic follow-up means have also been devised to overtake the switch lever in case the driver should fail to shift the same in advance of starting a car turn. An appropriate time lag between the starting and stopping of a given signal is effected by the use of ratchet gear means or an equivalent lever return agency capable of continuously prolonging the warning signal until an intended turn has been achieved. Subsequent to shifting the control lever out of its "off" position, the steering wheel may still be freely rotated in one direction corresponding to such shifted lever setting without further actuating the controller switch drum, but a reversal of the initial wheel travel promptly brings the ratchet gear into play and causes the shifted control lever to be carried back into its neutral position. When such position is reached, the lever remains standing in a dwell position, stop means being herein provided to temporarily retain the lever and thereby positively counteract switch overtravel while the released wheel continues to rotate onward in the aforesaid reversed direction.

The object of the present invention is to devise a relatively simple and reliable switch mechanism of the indicated character adapted to be supported upon stanchion means and to compactly assemble its more essential working parts in such fashion that they may be economically manufactured and readily demounted for repair needs. A further aim is to provide for a neat switch unit of pleasing exterior that shall not deface the interior trim of any high class automobile or bus to which it may be applied.

Embodied herein are also other structural features without requiring any substantial alterations in the regular steering gear structure, all of which aspects will hereinafter be more explicitly set forth. Reference is had to the accompanying two sheets of drawings that are illustrative of a certain embodiment of my invention, and in which drawings:

Fig. 4 depicts a transverse bottom view taken along the section line 4—4 of Fig. 1.

Figure 3:
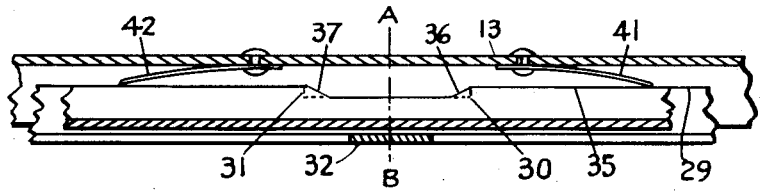

Fig. 5 presents a wiring diagram with the commutator drum shifted into its neutral position.

Referring in detail to the Figs. 1 to 4 embodiment, this assembly is more especially designed for new equipment purposes and as such may comprise a centrally apertured metal casing 10 preferably having a cup shaped profile of which the cylindrical skirt portion 11 is upturned and its marginal edge provided with a pair of oppositely disposed arcuate slots or gaps such as 12. The flanged cover or cap member 13 is reversely disposed with its endless peripheral flange depending to freely span the respective casing gaps.

The conventional steering gear generally includes a stationary tubular column 14 having a spindle 15 telescopically mounted therein. The upper spindle end carries a faced hub such as 16 of the rotatable steering wheel rim 17. Surrounding the topmost region of said column is a shouldered metallic sleeve member 18 and this may be fixedly attached by the screw 19. The central aperture of the casing 10 is sized to snugly receive said sleeve and these elements may be positively secured together in any suitable manner. The cap member 13 is centered upon the hub face and made to rotate in unison with the steering wheel movements by the use of screws or the like fasteners 20.

Rotatably mounted around the sleeve 18 and within the covered casing confines is a recessed bushing 21 of which the lower end region has a bakelite commutator or the like insulated controller drum 22 mounted thereon. Said drum may be equipped with one or more perimetrically spaced companion segments such as 23 and 24 (see Fig. 4). A series of resilient contacting fingers or other stationary insulated brush means 25, 26, 27, and 28 may be radially disposed about the movable controller drum.

Circumscribing the upper end of said bushing 21 is fixedly secured a cross-sectionally L shaped metal ring of which the upright leg constitutes a cam face 29 as detailed in Fig. 3. The major portion of such face is kept level but this cam profile is purposely depressed between a pair of vertical ratchet teeth 30 and 31 that are perimetrically spaced to provide opposed kickoff abutments.

The transverse leg of said ring is radially disposed and may be further shaped in one piece to constitute a manipulative drum lever 32 and an oppositely directed arrow or pointer means 33. These lateral ring projections respectively extend through a casing gap 12, the embracing cover flange being kept sufficiently short to leave an exposed slot through the casing skirt. Said ring may be doweled to the bushing 21.

The interior of the upturned casing skirt may be counterbored to mount a sheet metal annulus 34 equipped along its inner perimeter with an upstanding stationary cam face 35 which surrounds the annular cam face 29 in contiguous relationship. The respective endless profiles of both such cooperating cams may be kept substantially identical except that the face 35 is shown provided with oppositely arranged inclined components such as 36 and 37 in the manner represented in Fig. 3. The described rotary switch parts are so arranged that the lever handle 32 and its arrow may be selectively shifted through the predetermined angle α in either direction from the medial position A—B in alignment with the respective center lines C—D or E—F (see Fig. 2). As a result, one of the kickoff teeth 30 or 31 will be carried into registry with the medial center line A—B. Such lever position further causes the controller drum to be correspondingly rotated with respect to the several contacting fingers thereof.

Both arcuate casing gaps 12 are kept sufficiently long to permit the desired freedom of rotary handle shift and to act as a stop against abnormal overtravel. In addition, I provide for an apertured drum locating disc 38 that is fixedly mounted to rotate in unison with the bushing 21. The perimeter of said disc has several notches such as 39 cut therein (see Fig. 4) which are spaced to correspond with the shift angle α. A resilient detent 40 secured to the casing skirt, may include a radially inturned projection adapted to engage one of said notches and thereby retain the controller drum in proper operative position. If desired, complementary pilot lights such as 43 and 44 may be oppositely carried by the casing skirt to denote when a direction signal becomes operative.

Figure 2:
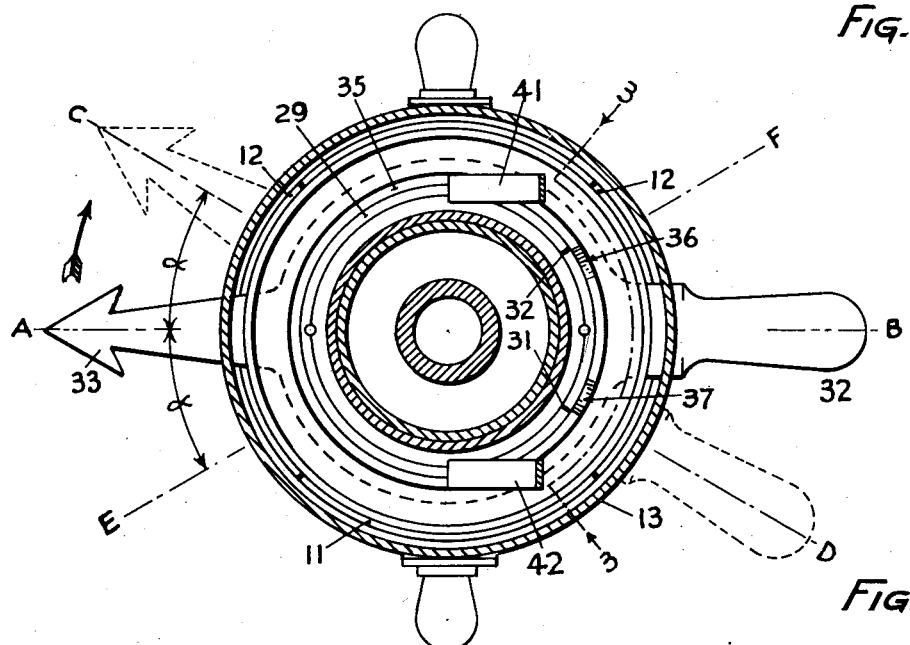
Fig. 2 represents a transverse top view taken along the section line 2—2 of Fig. 1, while Fig. 3 schematically illustrates a partial development of a cam profile as seen from the circular line 3—3 of Fig. 2.
Figure 1:
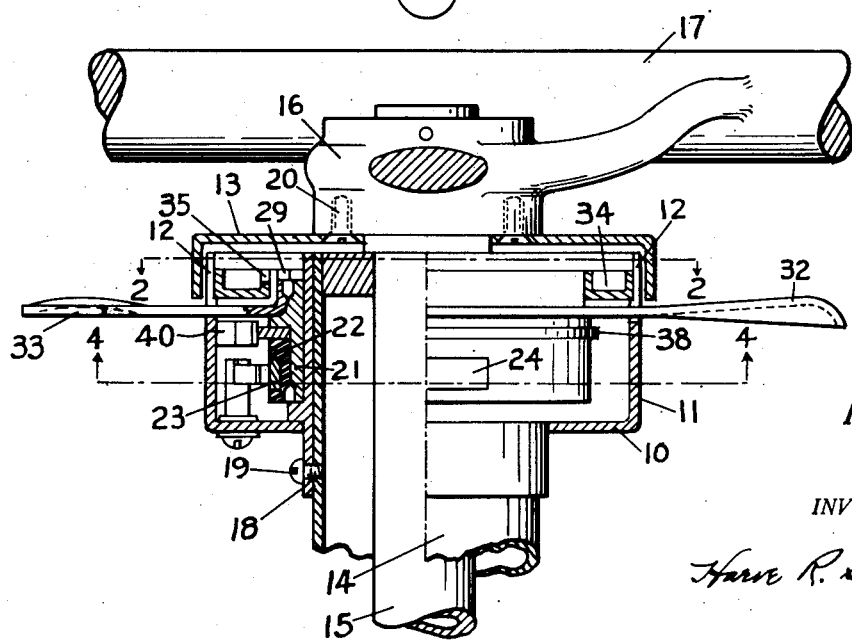
Fig. 1 shows an elevational view of my switch mechanism concentrically assembled about a steering wheel column and taken in partial section.

My automatic lever return mechanism is centered in a ratchet device and as such may assume various structural aspects. In the present instance, reversed pawls may be interposed between the rotatable cover 13 and the complementary endless cam profiles 29 and 35 to ride thereon in straddled relation. Such pawls may be of the pivoted type but it is here preferred to resort to the resilient striplike members 41 and 42 of which one end is fixedly attached to the cover with their respective retractible toes faced in opposite directions and adapted to follow up the combined underlying cam faces. In Fig. 2 such acute toes are shown diametrically spaced to impart to the steering wheel a correspondingly large preliminary or free rotary movement in either direction that permits guiding the car away from a contiguous curb prior to finally making a turn in the direction actually intended.

Referring now to the wiring diagram Fig. 5 as viewed from the top of the steering wheel, the drum segments 23 and 24 may be interconnected by the tie wire 45. When the lever 32 is placed in its neutral position, only the finger 26 will contact its cooperating segment 23 while the remaining fingers rest upon the insulated portion of the controller drum 22, as shown. A source of energizing current such as the car storage battery B, may have one terminal connected through the ignition switch S to the finger 26. A lead wire 46 connects the finger 27 with the other battery terminal and this lead includes a direction signal such as a right hand lamp R. A pilot lamp P may be wired across the lamp R. In similar fashion, the finger 28 is wired by the lead 47 to include another direction signal such as a left hand lamp L and a separate pilot P'. Said diagram further incorporates a stop light T or the like signal which is wired from the finger 25 by the lead 48; this supplementary circuit may be discarded when such stop light means need not be energized in unison with one of the L or R lamps.

Having described the structural arrangement of my inbuilt type of semi-automatic switch control, its mode of operation may be traced as follows:

It may first be pointed out that so long as the lever 32 remains standing in its neutral position A—B, the steering wheel 17 is incapable of bringing about a shift in the controller drum position represented in the Fig. 5 diagram. The rotated cover 13 will then cause its complementary pawls to ride freely along both upturned cam profiles 29 and 35. The respective profile depressions now stand radially aligned as in Fig. 3 with the kickoff edges 30 and 31 protectively masked behind the inclined cam components 36 and 37. As a result, the respective toes of the pawls 41 and 42 will merely glide into and through the depressed cam profile portion without interference.

The lever handle 32 is intended to extend toward the driver. Assuming that a right hand turn is contemplated, said lever is shifted clockwise by hand into its dotted Fig. 2 position C—D, which thereby sets the pointer arrow 33 in a corresponding direction. This manual operation may be performed in any wheel position but preferably while steering a straight course and some time prior to instigating a desired turn. As a consequence, the controller drum 22 of Fig. 5 will shift the segment 23 into bridging contact with the fingers 26 and 27 which lights the signal R. At the same time the finger 25 will contact the segment 24 to complete the tail light circuit T, if used. Hence, the proper signals will be instantly energized and remain active until automatically cut off by my ratchet devices.

Upon being shifted, said lever will carry the vertical kickoff edge or ratchet tooth 30 into registry with the center line A—B and outwardly from behind the stationary inclined cam component 36. If thereupon, the steering wheel is also rotated clockwise to start a contemplated car turn, the toe of the ratchet 41 will be freely dragged over the shifted edge 30 and subsequently drop into the adjoining profile depression. Upon continued wheel movement in the same direction, said pawl toe will be lifted by the upwardly inclined edge 37 and thereupon ride upon the level faces of the endless cams 29 and 35.

As regards the behavior of the complementary pawl 42, the steering wheel is still enabled to unobstructedly turn clockwise since this pawl toe when spun around sufficiently will likewise drop off of the set ratchet tooth 30 without interference. When a turn has been substantially completed and the car wheels are allowed to right themselves along a straight course, the reversal or resulting counterclockwise rotation of the steering wheel will freely drag the toe of the pawl 42 around and over the set kickoff edge 30. When, however, the acute toe of the other pawl 41 is brought toward and is made to strike against such raised ratchet tooth, it no longer clears but will become operatively engaged therewith. As a result, the rotatable cam 29 will be shifted counterclockwise and thereby automatically carry the lever 32 back into its neutral position. During such return lever movement, the pawl toe 41 will finally ride upon the fixed inclined cam component 36 which disengages said toe from the previously set abutment 30. Upon completing the lever return, the switch drum 22 will be correspondingly shifted, thus extinguishing the lighted lamps and otherwise reestablishing the switch controls for a similar sequence of events.

Because of the symmetrically balanced arrangement of my ratcheted switch members, a like result may be brought about when the manipulative lever 32 is thrown in an opposite direction to similarly light the left hand signal L. In the event that a false directional signal should be given, such shifted control lever may instantly be retracted by hand into its neutral position and thereby countermand the given signal, irrespective of the prevailing steering wheel position.

The switch working parts are so disposed that while the lever stands in its neutral setting, the steering wheel may without draining the battery B, still sharply skew the front wheels while parking a car, although the ignition switch may inadvertently be left closed. It is further emphasized that a turning of the steering wheel of itself, does not directly close either of the controller circuits. The use of a forwardly extended pointer arrow as shown, makes for an easily understood indicator that initially moves in the same direction in which it is intended to turn the steering wheel when contemplating a car turn. As an outstanding advantage, a driver may set the shiftable pointer 33 as described, some time prior to reaching an intersecting road turn, and thereafter the driver need give no further concern to the given signal, both hands being at liberty to actuate the steering wheel when such intersection has been reached. The signal remains active during this entire period but is automatically arrested by the normal rotary movement required of a geared steering wheel while executing a car turn.

It is thought the foregoing disclosure will make apparent to those skilled in this art, the inherent advantages afforded by my improved control devices, it being understood that various changes in the illustrative details thereof may be resorted to, all without departing from the spirit and scope of my invention heretofore described and more particularly defined in the appended claims.

I claim:

1. An electric switch assembly comprising a stationary part and a relatively movable part disposed about the axis of rotation, controller means including an actuated double throw contact component which has a neutral position, lever means serving to shift said component out of its neutral position into an active position, and ratchet means interposed between the movable part and the contact component, said ratchet means including a pawl disposed to straddle a pair of cooperating cam profiles circumscribing the aforesaid axis of which one such profile is supported by the aforesaid stationary part and the other is shiftable in unison with said contact component.

2. In an electrical direction indicating signal for an automotive vehicle including a rotatable steering wheel, the combination of switch means comprising a stationary part and a relatively movable part which latter is shiftable with respect to the stationary part, each such part being provided with a cam profile of which one such profile has opposed kick-off edges and the other has a pair of reversely inclined edges respectively serving to protectively mask a different kick-off edge when the movable part assumes a certain medial shift position, current control means including a double throw contact component that is operatively connected to shift in unison with the movable part, said component having a neutral position interposed between two alternative closed positions that respectively command a different signal circuit, means serving to selectively throw said contact component out of its neutral position into one of its closed positions and thereby carry the movable cam profile therewith to unmask one of said kick-off edges, and ratchet means including reversed pawl means actuated by the steering wheel and which pawls are respectively arranged to straddle the aforesaid cam profiles and permit said wheel to be unobstructedly rotated in a given direction through more than one revolution while keeping said one circuit closed without bringing about closure on part of the other circuit.

3. In an electric direction indicating signal for an automotive vehicle including a rotatable steering wheel, the combination of double throw switch means comprising a stationary part and a relatively movable part, each such part being provided with a cam profile that is relatively shiftable lengthwise in contiguous relationship of which one such profile has opposed kick-off edges and the other has a pair of reversely inclined edges respectively arranged to protectively mask a different kick-off edge when the movable part assumes a certain medial shift position and one of which kick-off edges is rendered active when the movable part is shifted out of its medial position, and pawl means cooperating with both of the aforesaid cam profiles, said pawl means being operatively connected to move in unison with the steering wheel.

4. In an electric direction indicating signal for an automotive vehicle including a rotatable steering wheel, the combination of switch means provided with a double throw contact making component having a neutral position interposed between alternative active positions that respectively close a different signal circuit and which component has associated therewith a cam profile that is shiftable lengthwise with respect to a cooperating stationary cam profile, one such profile having a kick-off edge and the other an inclined edge which serves to protectively mask said kick-off edge in one profile shift position and which inclined edge when withdrawn into another position renders the kick-off edge operative, means for throwing said contact component out of its neutral position into one of its active positions, and pawl means disposed to bridgingly ride the aforesaid cam profiles, said pawl means being operatively connected to move in unison with the steering wheel and serving to automatically return the contact component toward its neutral position when the kick-off edge is rendered active.

5. In an electric direction indicating signal for an automotive vehicle including a rotatable steering wheel, the combination of switch means provided with a double throw contact making component having a neutral position interposed between alternative active positions that respectively close a different signal circuit, a movable cam serving to actuate the aforesaid switch component, said cam being located beneath said wheel and mounted to rotate around the axis thereof with the cam profile directed toward the hub of said wheel, a stationary cam having a similarly directed profile cooperatively disposed alongside the first named profile, one such profile having a kick-off edge and the other an inclined edge that serves to protectively mask said kick-off edge when the switch component assumes a neutral position, said rotatable cam when shifted out of such position serving to render the kick-off edge operative, and pawl means retractibly attached to and rotatably carried by the wheel, said pawl being retractible toward the wheel hub and interposed to ride across both of said cam profiles.

6. In an electrical direction indicating signal for an automotive vehicle including a rotatable steering wheel, the combination of double throw switch means comprising a shiftable make and break contact component having a neutral position, and manipulative lever means serving to shift said contact component out of its neutral position into alternative active positions, the opposite ends of said lever being respectively equipped with handle means and with pointer means that are interconnected by an annular yoke portion that circumscribes the wheel axis.

7. An electric switch assembly comprising a stationary part and a relatively movable part disposed in coaxial relationship, controller means including an actuated double throw contact component which has a neutral position, ratchet means interposed between the movable part and the contact component, said means including a pair of opposed pawls disposed to straddle and ride upon relatively shiftable cam faces whose profiles are respectively provided with a plurality of kick off edges and with correspondingly inclined edges respectively arranged to overlappingly register with a kick off edge and protectively hold said pawls out of active engagement while the contact component remains in neutral position, and means shifting one such profile lengthwise of the other profile to bring one such pawl into active engagement with a kick off edge and thereby actuate said contact component.

HARVE R. STUART.